(12) United States Patent
Axelsson (10) Patent No.: US 12,114,618 B2
(45) Date of Patent: Oct. 15, 2024

(54) RAIN CLOUD (71) Applicant: Ericka Axelsson, Woodstock, GA (US)

(72) Inventor: Ericka Axelsson, Woodstock, GA (US)

( * ) Notice: Subject to any disclaimer, the term of this patent is extended or adjusted under 35 U.S.C. 154(b) by 0 days.

(21) Appl. No.: 17/838,186

(22) Filed: Jun. 11, 2022

(65) Prior Publication Data
US 2023/0397555 A1 Dec. 14, 2023

(51) Int. Cl.
A01G 27/00 (2006.01)
(52) U.S. Cl.
CPC ................... A01G 27/008 (2013.01)
(58) Field of Classification Search
CPC .... A01G 27/008; A01G 27/005; A01G 27/00; A01G 25/02
See application file for complete search history.

(56) References Cited

U.S. PATENT DOCUMENTS

| | | | | |
|---|---|---|---|---|
| 2018/0100666 A1* | 4/2018 | Park | .......................... | F24F 6/04 |
| 2018/0325044 A1* | 11/2018 | Tilley | ..................... | A01G 17/06 |
| 2018/0368340 A1* | 12/2018 | Ielo | ....................... | A01G 27/001 |
| 2018/0368342 A1* | 12/2018 | Purcell | ................. | A01G 27/005 |
| 2019/0116742 A1* | 4/2019 | Denton | ................ | B05B 15/625 |
| 2020/0344965 A1* | 11/2020 | Song | ....................... | H05B 47/16 |
| 2021/0140656 A1* | 5/2021 | Seo | ...................... | C02F 1/46104 |
| 2022/0159915 A1* | 5/2022 | Ayres | .................... | A01G 9/0297 |
| 2022/0312695 A1* | 10/2022 | Masarwa | ............... | A01G 25/02 |
| 2022/0369566 A1* | 11/2022 | Venkata | .................... | A01G 9/16 |
| 2023/0165201 A1* | 6/2023 | Hausauer | ................. | A01G 9/02 47/79 |
| 2023/0172119 A1* | 6/2023 | Lee | ...................... | A01G 27/008 47/66.1 |

OTHER PUBLICATIONS

Sutcliffe. (Jun. 9, 2022). Etsy. Retrieved from https://www.etsy.com/listing/1185591218/3d-printed-rain-cloud-plant-waterer?click_key=3dbf829995f9a103a90fe165d75a4ca73de65a8e%3A1185591218&click_sum=434f15e8&ref=internal_similar_listing_bot-2&sts=1&listing_id=1185591218&listing_slug=3d-printed-rain-cloud (Year: 2022).*
Brandon. (May 22, 2022). Etsy. Retrieved from https://www.etsy.com/listing/1205638363/rain-cloud-20-plant-watering-accessory?ga_order=most_relevant&ga_search_type=all&ga_view_type=gallery&ga_search_query=rain+cloud+%283+inch+pot+size%29&ref=sc_gallery-1-1&plkey=6308149f8ecbb7f8ec602e2b361acd2b12fed7d (Year: 2022).*
Disclosure of Item Sold on or About Jan. 27, 2021.
3D Printable Rain Cloud Pot by Naomi McDonald (myminifactory.com), Rain Cloud Self Waterer by Fred & Friends—Canada (outerlayer.com), Rain Cloud 3 Inch Pot (Etsy), 3D Printed Rain Claoud Waterer (Etsy) Rain Cloud 2.0 Plant Waterer (Etsy), Houseplant Watering Cloud (Etsy), Plant Watering Cloud/Watering Spike//Plant Accessory// (Etsy), Rain Cloud Watering Planter—GeekGet, Rainmaker: A Plant Water Cloud (design-milk.com).

* cited by examiner

Primary Examiner — Monica L Perry
Assistant Examiner — Aaron M Rodziwicz
(74) Attorney, Agent, or Firm — GRONHOLM PATENT SERVICES (57) ABSTRACT A novelty watering device for plants usable with a plant container. The device includes a cloud-shaped container which dispenses individual water droplets downwardly to simulate rain falling from a cloud.

3 Claims, 9 Drawing Sheets

RAIN CLOUD

TECHNICAL FIELD

The presently disclosed embodiments are related, in general, to a watering device. More particularly, the presently disclosed embodiments are related to a device that is configured to a planting pot for watering plants.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Typically, watering plants requires a manual method of pouring water by holding a container intended to disperse water on the plant. Traditionally, watering containers are held by a user or affixed to some complex equipment. Hence, the existing watering devices and systems suffer from several disadvantages such as, for example, requiring complex mechanisms to operate and being difficult to install due to complex methods of assembly. This specification recognizes that there is a necessity for a simple and cost-effective watering device for plants that can be used with a plant container as well as a stand.

Thus, in view of the above, there is a long-felt need to address the aforementioned deficiencies and inadequacies.

Further limitations and disadvantages of conventional and traditional approaches will become apparent to one of skill in the art, through comparison of the described methods with some aspects of the present disclosure, as set forth in the remainder of the present application and with reference to the drawings.

SUMMARY

According to embodiments illustrated herein, there may be provided a watering device for plants usable with a plant container. The watering device includes a water reservoir tank and two acrylic rods. The water reservoir tank is adapted to contain a predefined amount of water to prevent overwatering. The water reservoir tank is molded in a shape of a puffy cloud being cast into a one piece molded portion or two separate molded portions comprising a top portion and a bottom portion. The water reservoir tank comprises a plurality of drip holes to create a plurality of individual water drops to provide a pleasing aesthetic effect. The two acrylic rods include a top end and a bottom end. The top ends of the two acrylic rods are detachably attached to a proximal end and a distal end of the water reservoir tank. The bottom ends of the two acrylic rods are adaptable to be inserted into the plant container to allow the water reservoir tank to be suspended on the two acrylic rods.

In an aspect, the drip holes are surrounded by a textured surface so that water drops are prevented from wicking or pooling. The droppers in ideal conditions keep the "rain" nicely separate. In the event someone was to slightly overfill the reservoir and water spilled down the side, as a result of physical science, traditionally the water from the droplets would be attracted to the overflow water and begin to wick. This can be an issue where the bottom surface of a traditional reservoir is completely smooth, the added texture is to prevent the water from traveling horizontally and wicking as it exits from the drip holes. It will be appreciated that the textured design will maintain a more appealing appearance while preventing wicking.

In an aspect, the water reservoir tank includes an interior shape designed to maximize the downward force to ensure the water reservoir completely empties.

In an aspect, the top portion comprising a female attachment means and the bottom portion comprising a male attachment means, wherein the female attachment means and the male attachment means to allow the two separate molded portions of the water reservoir tank to detachably attach to the opposite member.

In an aspect, the water reservoir tank is configured such that the male attachment means is insertable into the female attachment means for a snap-fit engagement.

In an aspect, the female attachment means and the male attachment means are placed in a center of each separate molded portion.

In an aspect, the female attachment means and the male attachment means are surrounded by a silicone material to provide a tighter fit.

In an aspect, the predefined amount of water is in the range of 115 mL to 120 mL.

In an aspect, the two separate molded portions facilitate a user to open and clean the water reservoir tank.

In an aspect, the bottom ends of the two acrylic rods act as a stand so that the water reservoir tank is used for a small plant.

In an aspect, the water from the water reservoir tank is emptied in about 8-10 minutes.

In an aspect, the bottom portion of the water reservoir tank includes a first aperture and a second aperture.

In an aspect, the first aperture and the second aperture are configured to receive the top ends of the acrylic rods.

Accordingly, one advantage of the present invention is that the water reservoir tank is designed to hold a reasonable amount of water to prevent over-watering.

Accordingly, one advantage of the present invention is that the acrylic rods are adaptable to existing potted plants, and there is no need to use a specific pot.

Accordingly, one advantage of the present invention is that the drip holes are specifically made to create small individual drops making sure it has a pleasing aesthetic effect.

Accordingly, one advantage of the present invention is that the water reservoir tank can be separated into two parts so that the user can open it up for cleaning.

Accordingly, one advantage of the present invention is that the water reservoir tank includes a protruding cone design that surrounds the drip holes to keep the water drops nicely shaped.

These and other features and advantages of the present disclosure may be appreciated from a review of the following detailed description of the present disclosure, along with the accompanying figures in which reference numerals refer to like parts throughout.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the apparatuses, methods, and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
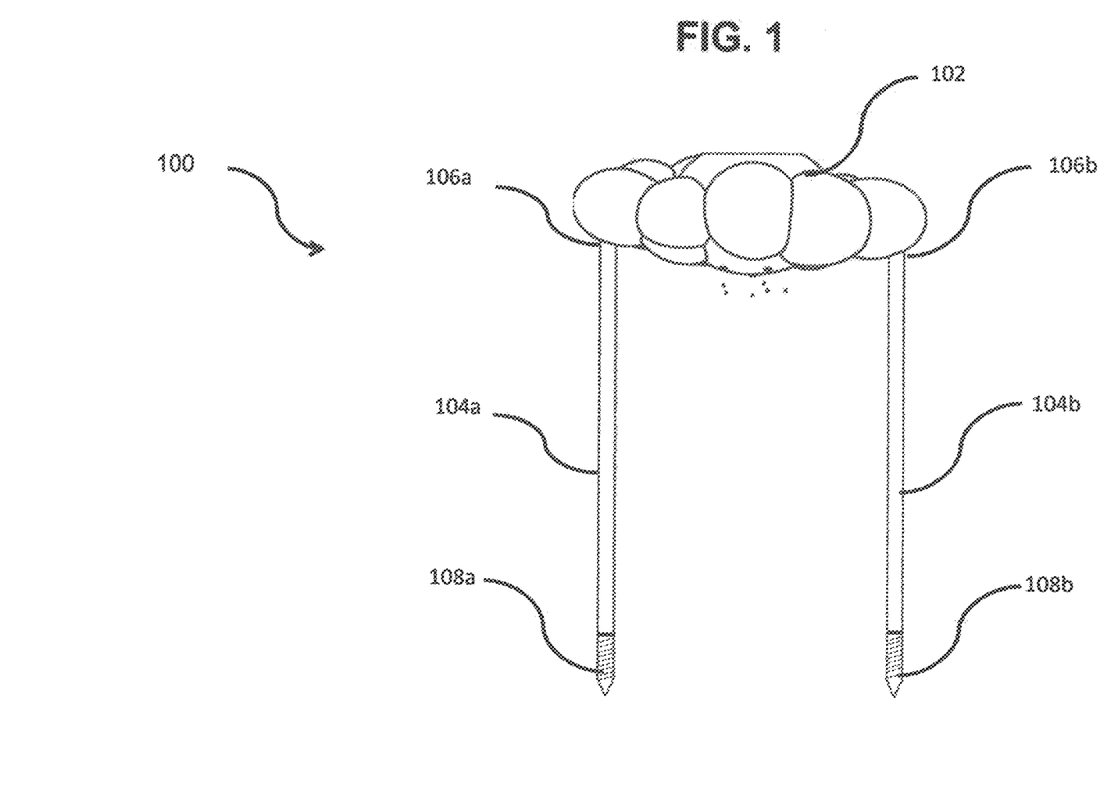
FIG. 1 is a perspective view of various key components i.e., a water reservoir tank, and two acrylic rods of a watering device, in accordance with at least one embodiment.

The present specification describes a watering device for plants usable with a plant container. FIG. 1 is a perspective view a water reservoir 102, and two acrylic rods 104a, and 104b of a watering device 100, in accordance with at least one embodiment. The water reservoir tank 102 is adapted to contain a predefined amount of water to prevent overwatering. In an embodiment, the predefined amount of water is in the range of 115 mL to 120 mL. The water reservoir tank 102 is supported on the acrylic rods 104a, and 104b which can be inserted directly into the plant container.

Figure 2:
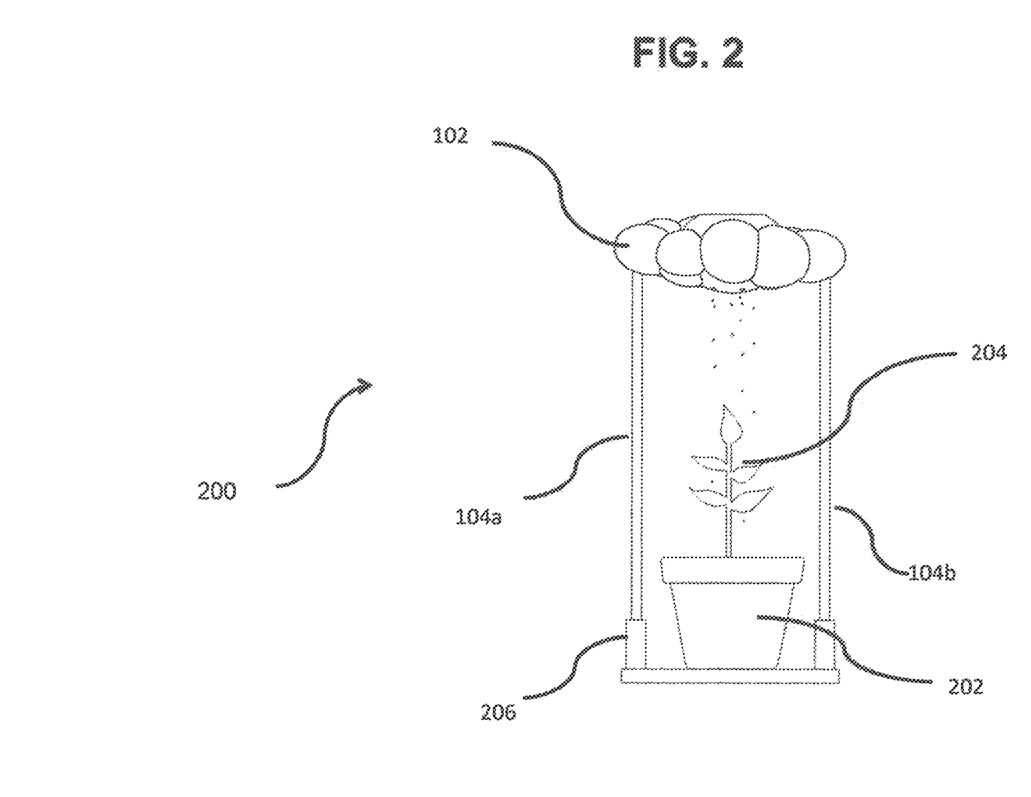
FIG. 2 is an installed view of the watering device for plants usable with a plant container and a stand, in accordance with at least one embodiment.

FIG. 2 is an installed view 200 of the watering device 102 for plants 204 usable with a plant container 202, in accordance with at least one embodiment. The acrylic rods 104a, and 104b can be inserted directly into the plant container 202 or a stand 206 for smaller pots. FIG. 2 is explained in conjunction with FIG. 1. In an embodiment, the two acrylic rods 104a, and 104b are clear/transparent acrylic rods. Being clear or/transparent the two acrylic rods 104a, and 104b blend in with the color of the plant and look like water. The two acrylic rods 104a, and 104b include top ends 106a, and 106b, and bottom ends 108a, and 108b. In an embodiment, the bottom ends 108a, and 108b of the two acrylic rods 104a and 104b are green tips that are an optional feature that is not necessary and not used when used with a stand, only used when directly in a plant pot. The green tips can be easily applied and removed depending on whether the acrylic rods 104a and 104b is being utilized for a plant container 202 or a stand 206.

Figure 3A:
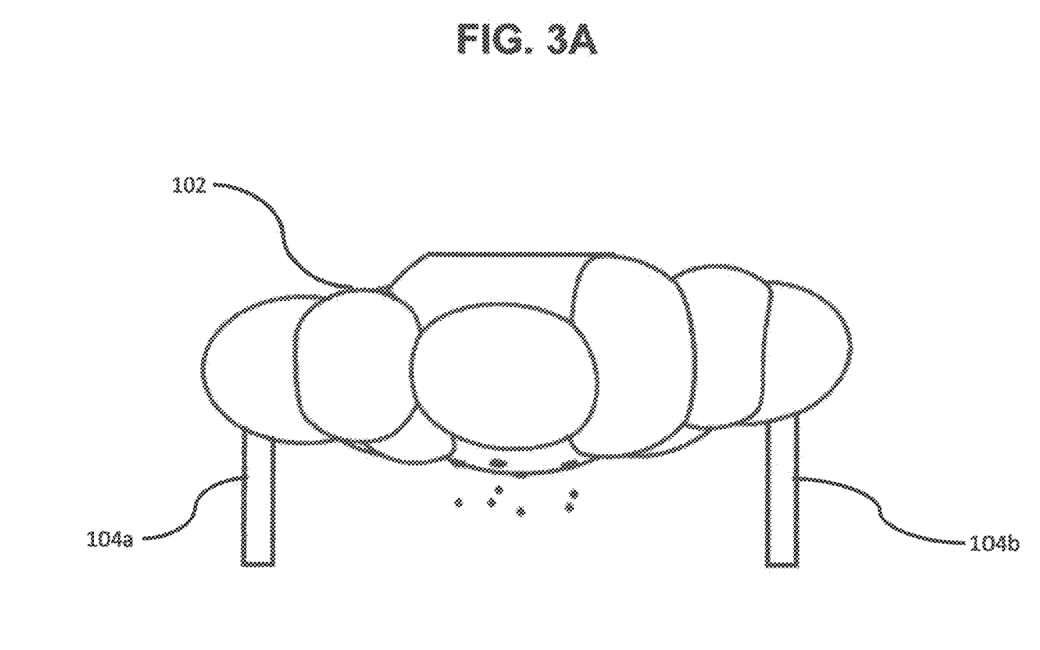
FIG. 3A is a perspective view of the two acrylic rods inserted into the water reservoir tank, in accordance with at least one embodiment.

FIG. 3A is a perspective view of the two acrylic rods inserted into the water reservoir tank, in accordance with at least one embodiment. The top ends 106a, and 106b of the two acrylic rods 104a and 104b are detachably attached to a proximal end 302a (shown in FIG. 3B) and a distal end 302b of the water reservoir tank 102. The bottom ends 108a, and 108b of the two acrylic rods 104a, and 104b are adaptable to be inserted into plant container 202 to allow the water reservoir tank 102 to be suspended on the two acrylic rods 104a, and 104b. In an embodiment, the bottom ends 108a, and 108b of the two acrylic rods 104a and 104b act as a stand so that the water reservoir tank is used for a small plant.

Figure 3B:
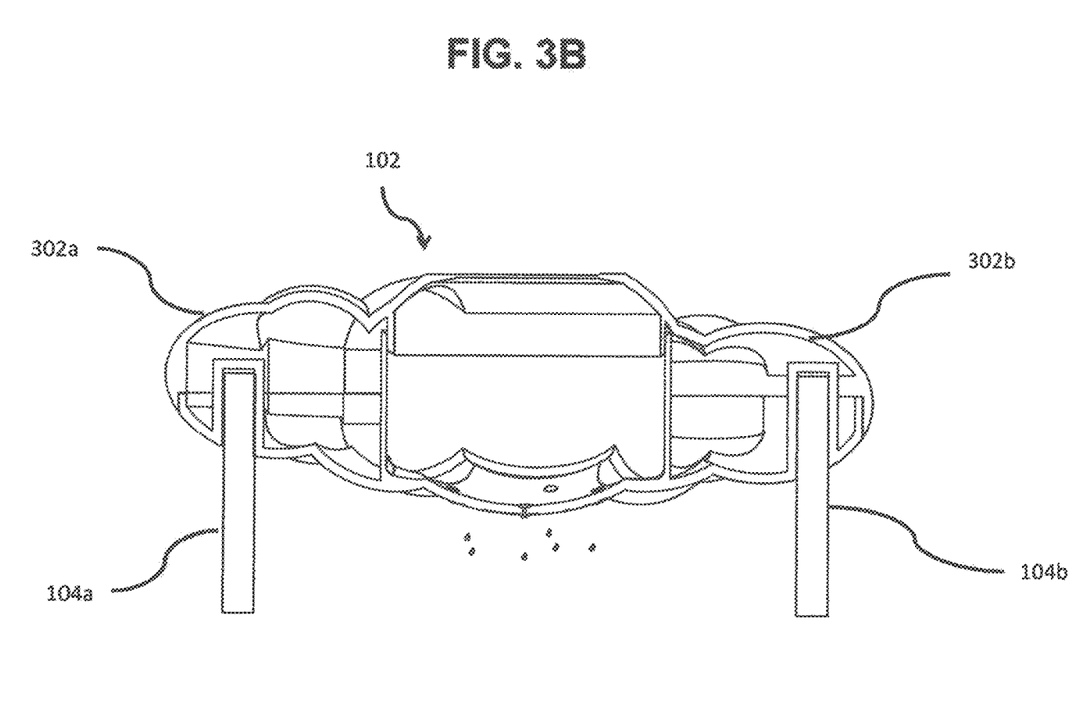
FIG. 3B is a cross-sectional view of the watering device that depicts how the top portion of the two acrylic rods can be detachably attached to a proximal end.

FIG. 3B is a cross-sectional view of the watering device that depicts how the top portion of the two acrylic rods can be detachably attached to a proximal end. The top ends 106a, and 106b of the two acrylic rods 104a and 104b are detachably attached to a proximal end 302a and a distal end 302b of the water reservoir tank 102.

Figure 4:
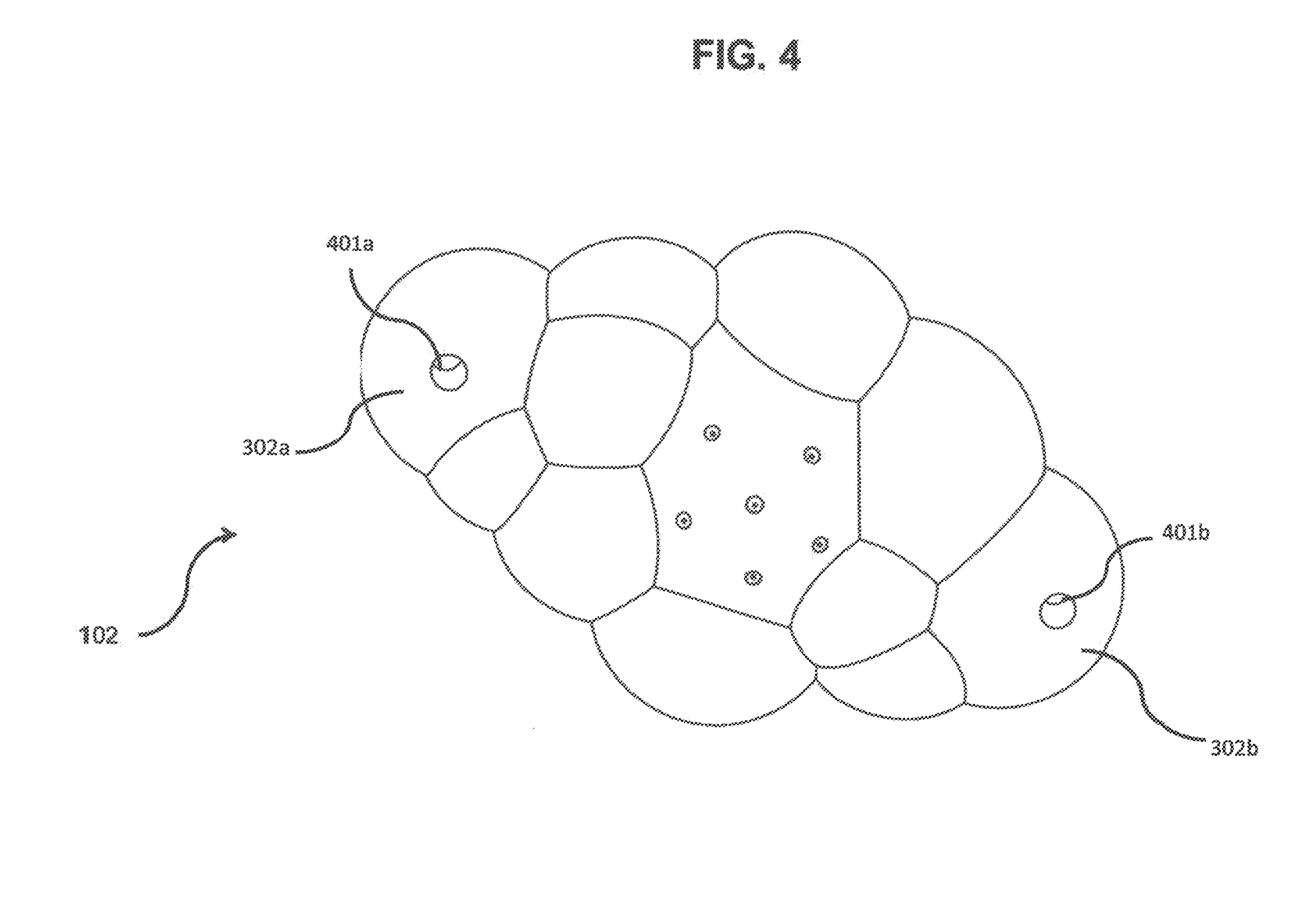
FIG. 4 is a perspective view of the water reservoir tank, in accordance with at least one embodiment.

FIG. 4 is a perspective view of the water reservoir tank 102, in accordance with at least one embodiment. The water reservoir tank 102 includes a proximal end 302a and a distal end 302b to secure the top ends 106a, and 106b of the two acrylic rods 104a, and 104b. The water reservoir tank 102 has a shape of a puffy cloud sitting over the plant that has to be poured with water. The water slowly drips overtime looking like a gentle rain. The water reservoir tank 102 is both aesthetically pleasing and allows for the plant to absorb the water more slowly which can be a benefit for some plants.

In an embodiment, the bottom portion 504 of the water reservoir tank 102 includes a first aperture 401a and a second aperture 401b. The first aperture 401a and the second aperture 401b are configured to receive the top ends 106a, and 106b of the acrylic rods 104a, and 104b.

Figure 5A:
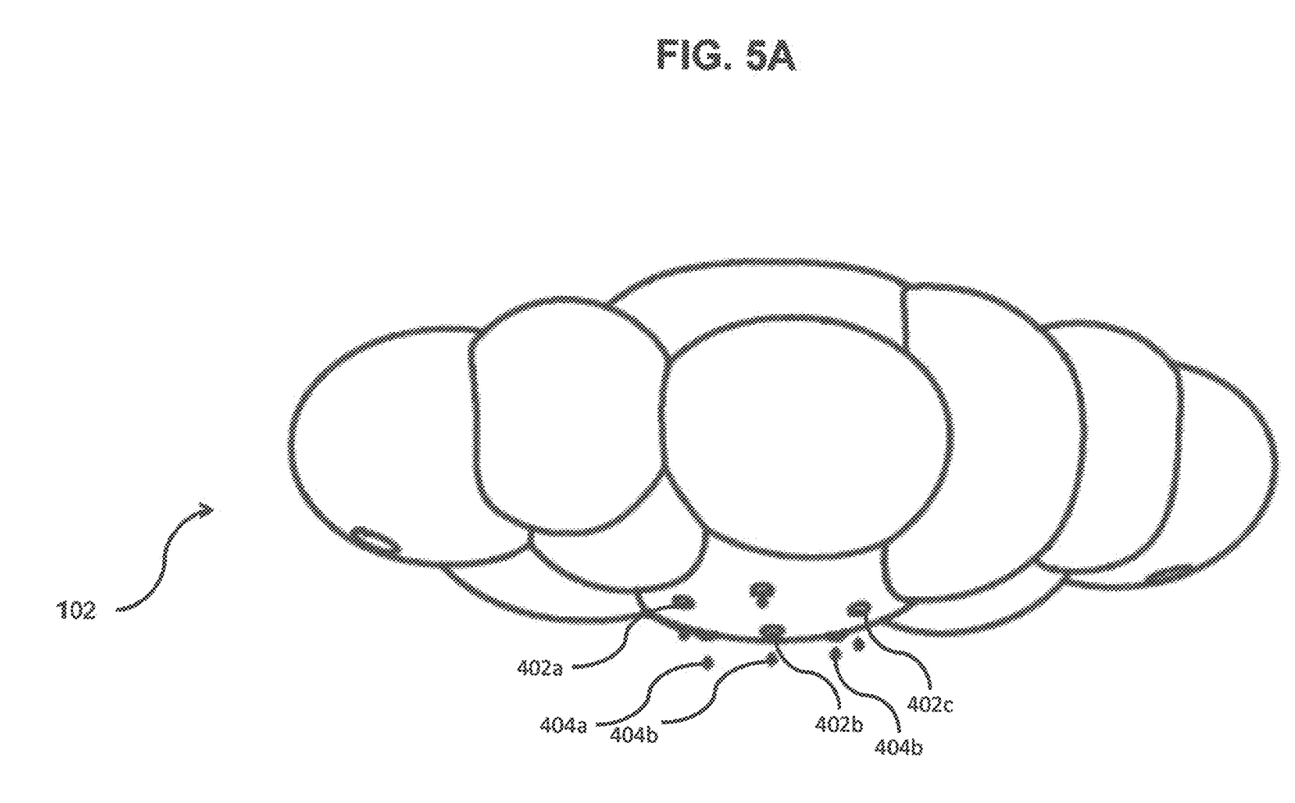
FIG. 5A is a perspective view of various drip holes of the water reservoir tank, in accordance with at least one embodiment.

FIG. 5A is a perspective view of various drip holes 402a, 402b, and 402c of the water reservoir tank 102, in accordance with at least one embodiment. The water reservoir tank 102 comprises a plurality of drip holes 402a, 402b, and 402c to create a plurality of individual water drops 404a, 404b, and 404c to provide a pleasing aesthetic effect. In an embodiment, the drip holes 402a, 402b, and 402c are designed to include cone shaped body extending downward to the drip holes so that water builds into small droplet shapes. In an embodiment, the water from the water reservoir tank is emptied in about 8-10 minutes.

Figure 5B:
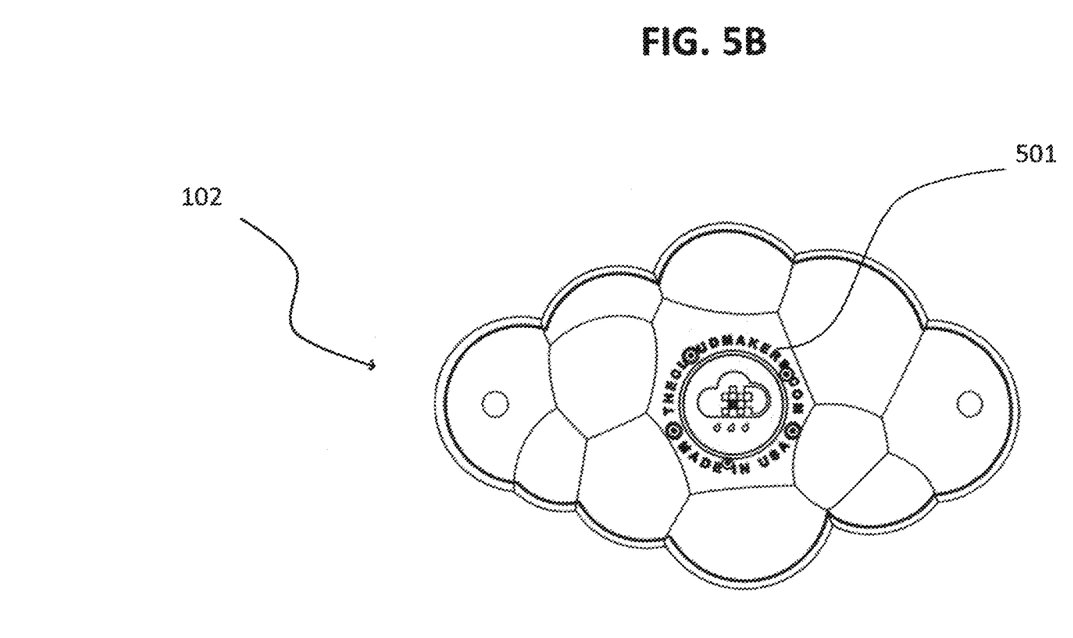
FIG. 5B is a bottom view of a textured bottom surface of the water reservoir tank, in accordance with at least one embodiment.

FIG. 5B is a bottom view of a textured surface 501 of the water reservoir tank 102, in accordance with at least one embodiment. The bottom portion of the water reservoir tank 102 has a textured surface to ensure that the water won't wick and travel horizontally. In case, someone slightly overfills the water reservoir tank 102, the textured surface prevents the water from wicking along the bottom of the water reservoir tank 102.

Thus, the drip holes 402a, 402b, and 402c of the water reservoir tank 102 have a size and shape to make sure that the water stays as individual small droplets. The protruding cone shape of the drip holes 402a, 402b, and 402c ensure that the drops stay small and do not travel back towards the body of the cloud after leaving the water reservoir tank 102. It can be appreciated that the drip holes can be designed in any shape or size known in the art that improves the shape and appearance of the water drops.

Figure 6:
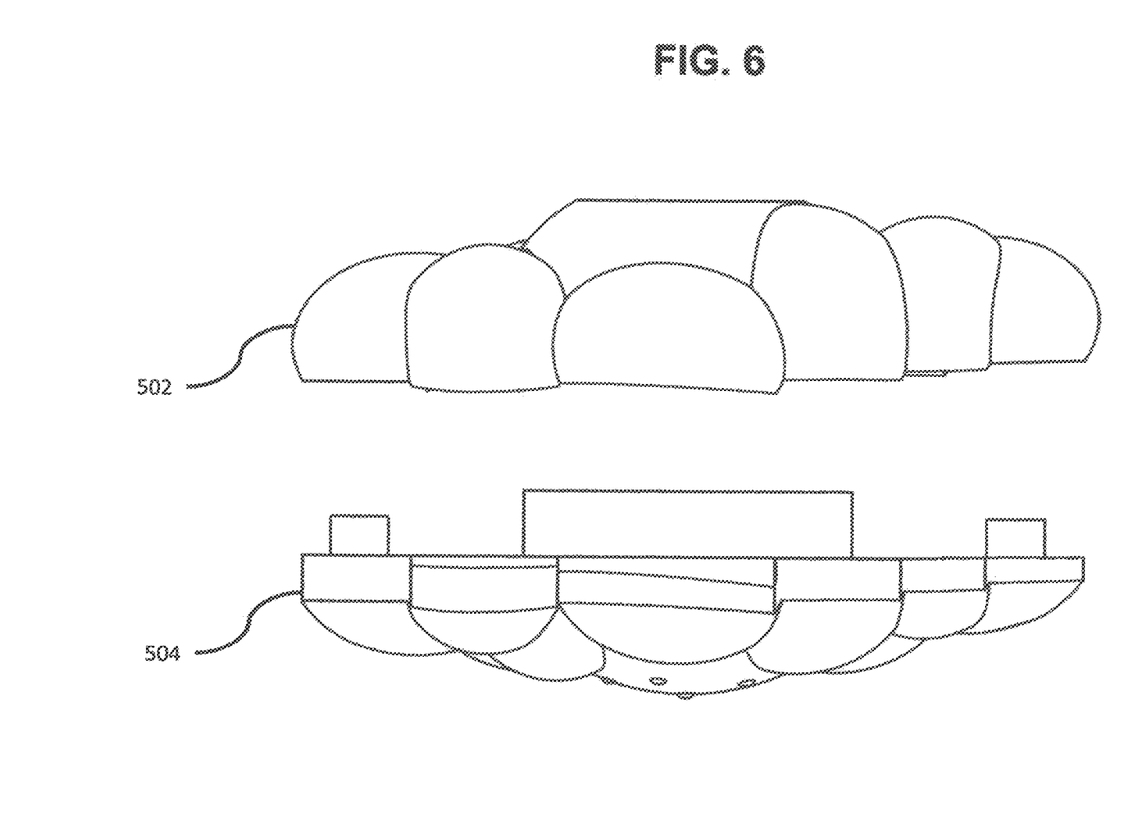
FIG. 6 is a perspective view of two separate molded portions of the water reservoir tank, in accordance with at least one embodiment.

FIG. 6 is a perspective view of two separate molded portions 502, and 504 of the water reservoir tank 102, in accordance with at least one embodiment. The water reservoir tank 102 is molded in a shape of a puffy cloud being cast into two separate molded portions comprising a top portion 502 and a bottom portion 504. In an embodiment, the water reservoir tank 102 includes an exterior shape designed to prevent the water from pooling into one big drop. In an embodiment, the angled interior shape ensures that the water reservoir tank 102 empties fully (no water pooling). Typically, having the water stored more vertically keeps the pressure as a downward force, while putting the same amount of water in a more horizontal reservoir would create less downward pressure.

Figure 7:
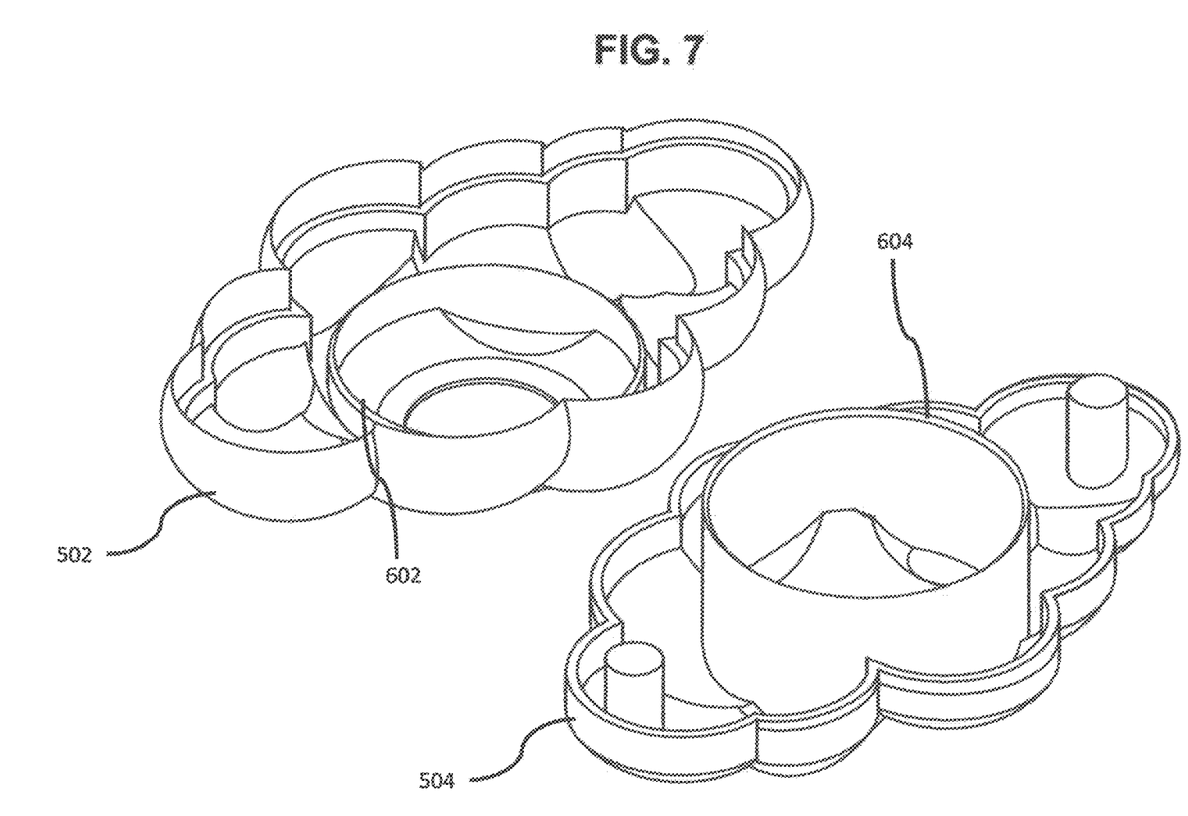
FIG. 7 is an open view of two separate molded portions of the water reservoir tank, in accordance with at least one embodiment.

FIG. 7 is an open view of two separate molded portions of the water reservoir tank, in accordance with at least one embodiment. In an embodiment, the top portion 502 comprising a female attachment means 602 and the bottom portion 504 comprising a male attachment means 604. The depiction also shows the closed end of the first aperture 401a and second aperture 401b. The female attachment means 602 and the male attachment means 604 to allow the two separate molded portions 502, and 504 of the water reservoir tank 102 to be detachably attached. In an embodiment, the water reservoir tank 102 is configured such that the male attachment means 604 is insertable into the female attachment means 602 for a snap-fit engagement. In an embodiment, the female attachment means 602 and the male attachment means 604 are placed in a center of each separate molded portion. In an embodiment, the female attachment means 602 and the male attachment means 604 are surrounded by a silicone material to provide a tighter fit. In an embodiment, the two separate molded portions facilitate a user to open and clean the water reservoir tank 102.

Thus, the present invention provides a water reservoir tank designed to hold a reasonable amount of water to prevent overwatering. Further, the acrylic rods are adaptable to existing potted plants, and there is no need to use a specific pot. Additionally, the drip holes are specifically made to create small individual drops making sure it has a pleasing aesthetic effect. Furthermore, the water reservoir tank can be separated into two parts so that the user can open it up for cleaning.

A person skilled in the art will understand that the watering device for plants usable with a plant container is described herein for illustrative purposes and should not be construed to limit the scope of the disclosure.

A person with ordinary skills in the art will appreciate that the apparatuses and devices have been illustrated and explained to serve as examples and should not be considered limiting in any manner. It will be further appreciated that the variants of the above-disclosed system elements, modules, and other features and functions, or alternatives thereof, may be combined to create other different apparatuses, systems, or applications.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A novelty watering device for use in watering a plant positioned in a planting container, said watering device comprising:
   a water reservoir tank defining an outer surface simulating a rain cloud, and configured to temporarily contain a predetermined amount of water, such that said water drops in individual droplets of water downwardly therefrom, said water reservoir tank including two portions configured to be assembled and comprising:
   A) a top portion defining an upper opening and including an upper inner subcontainer portion;
   B) a bottom portion having a bottom portion floor, said bottom portion including a lower inner subcontainer portion, said lower inner subcontainer portion including a subcontainer floor including at least one drip hole,
   said top portion and said bottom portion combining to provide said water reservoir tank with a cloud-shaped exterior,
   said top portion and said bottom portion combining to define a water reservoir tank cavity,
   said upper inner subcontainer portion and said lower inner subcontainer portion combining when assembled to define an inner subcontainer configured to be filled with water through said upper opening,
   said inner subcontainer being less in interior volume than said water reservoir cavity such that part of said water reservoir tank cavity is outside of said inner subcontainer and is not configured to accept said water,
   said at least one drip hole being in said subcontainer floor of said lower inner subcontainer portion,
   said subcontainer floor being a portion of said floor of said bottom portion floor,
   such that water poured into said upper opening of said water reservoir tank is temporarily contained within said inner subcontainer, such that water drips out of said at least one drip hole to simulate water dripping out of a cloud, until said inner subcontainer is at least partially emptied.

2. The water reservoir tank as claimed in claim 1, wherein said top and bottom portions meet at a connecting interface when assembled, and wherein said upper inner subcontainer portion defines an upper edge which is positioned vertically above said connecting interface between said upper and lower portions, when said water reservoir tank is positioned for use.

3. A novelty watering device for use in watering a plant positioned in a planting container, said watering device comprising:
- a water reservoir tank defining an outer surface simulating a rain cloud, and configured to temporarily contain a predetermined amount of water, such that said water drops in individual droplets of water downwardly therefrom, said water reservoir tank including two portions configured to be assembled and comprising:
  - A) a top portion defining an upper opening and including an upper inner subcontainer portion;
  - B) a bottom portion having a bottom portion floor, said bottom portion including a lower inner subcontainer portion, said lower inner subcontainer portion including a subcontainer floor including at least one drip hole,
- said top portion and said bottom portion combining to provide said water reservoir tank,
- said top portion and said bottom portion combining to define a water reservoir tank cavity,
- said upper inner subcontainer portion and said lower inner subcontainer portion combining when assembled to define an inner subcontainer configured to be filled with water through said upper opening,
- said inner subcontainer being less in interior volume than said water reservoir cavity such that part of said water reservoir tank cavity is outside of said inner subcontainer and is not configured to accept said water,
- said at least one drip hole being in said subcontainer floor of said lower inner subcontainer portion,
- said subcontainer floor being a portion of said floor of said bottom portion floor,
- such that water poured into said upper opening of said water reservoir tank is temporarily contained within said inner subcontainer, such that water drips out of said at least one drip hole to simulate water dripping out of a cloud, until said inner subcontainer is at least partially emptied.

* * * * *